US008275172B2

(12) United States Patent
Wilby et al.

(10) Patent No.: US 8,275,172 B2
(45) Date of Patent: Sep. 25, 2012

(54) MULTIPASS DATA INTEGRATION FOR AUTOMATIC DETECTION AND CLASSIFICATION OF OBJECTS

(75) Inventors: Andrew D. Wilby, Redondo Beach, CA (US); J. Kent Harbaugh, Burbank, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 328 days.

(21) Appl. No.: 12/610,243

(22) Filed: Oct. 30, 2009

(65) Prior Publication Data

US 2011/0103642 A1     May 5, 2011

(51) Int. Cl.
*G06K 9/00*         (2006.01)
(52) U.S. Cl. .................................. 382/103; 345/357.42
(58) Field of Classification Search .................. None
See application file for complete search history.

(56) References Cited

U.S. PATENT DOCUMENTS

| | | | |
|---|---|---|---|
| 4,042,925 A | 8/1977 | Albanese et al. | |
| 4,075,599 A | 2/1978 | Kosalos et al. | |
| 4,335,944 A | 6/1982 | Marshall | |
| 4,439,845 A | 3/1984 | Geohegan, Jr. et al. | |
| 4,847,817 A | 7/1989 | Au et al. | |
| 6,078,281 A | 6/2000 | Milkovich et al. | |
| 6,084,827 A | 7/2000 | Johnson et al. | |
| 6,208,584 B1 | 3/2001 | Skinner | |
| 6,778,469 B1 | 8/2004 | McDonald | |
| 6,870,793 B2 | 3/2005 | Ishihara et al. | |
| 6,963,425 B1 | 11/2005 | Nair et al. | |
| 6,980,483 B2 | 12/2005 | McDonald | |
| 2007/0230914 A1 | 10/2007 | Garrido et al. | |
| 2009/0226108 A1 | 9/2009 | Kent | |
| 2010/0176987 A1* | 7/2010 | Hoshizaki ................ 342/357.02 | |

OTHER PUBLICATIONS

Blackburn, Michael R., "Motion Based Target Acquisition and Evaluation in an Adaptive Machine Vision System", Presented at the Video Photogrammetry and Exploitation Conference, pp. 1-24, May 11-12, 1995.
Blom, H.A.P. et al., "Combining Interacting Multiple Model and Joint Probabilistic Data Association for Tracking Multiple Maneuvering Targets in Clutter", Proceedings of the 5th International Conference on Information Fusion, National Aerospace Laboratory NLR, NLR-TP-2002-443, pp. 1-24, Aug. 2002. Sandirasegaram, Nicholas et al., "Comparative Analysis of Feature Extraction (2D FFT & Wavelet) and Classification (Lp Metric Distances, MLP NN, & HNet) Algorithms for SAR Imagery", Proceedings of SPIE, the International Society for Optical Engineering, vol. 5808, pp. 314-325, 2005.
Williams, Jason L., "Gaussian Mixture Reduction for Tracking Multiple Maneuvering Targets in Clutter", Thesis, Department of the Air Force Air University, Air Force Institute of Technology, pp. 1-247, Mar. 25, 2003.
International Search Report and Written Opinion for International Application No. PCT/US10/53874, mailed Dec. 17, 2010.

* cited by examiner

*Primary Examiner* — Jingge Wu
*Assistant Examiner* — Thomas A James
(74) *Attorney, Agent, or Firm* — Christie, Parker & Hale, LLP

(57) ABSTRACT

Classification of a potential target is accomplished by receiving image information, detecting a potential target within the image information and determining a plurality of features forming a feature set associated with the potential target. The location of the potential target is compared with a detection database to determine if it is close to an element in the detection database. If not, a single-pass classifier receives a potential target's feature set, classifies the potential target, and transmits the location, feature set and classification to the detection database. If it is close, a fused multi-pass feature determiner determines fused multi-pass features of the potential target and a multi-pass classifier receives the potential target's feature set and fused multi-pass features, classifies the potential target, and transmits its location, feature set, fused multi-pass features and classification to the detection database.

19 Claims, 3 Drawing Sheets

MULTIPASS DATA INTEGRATION FOR AUTOMATIC DETECTION AND CLASSIFICATION OF OBJECTS

TECHNICAL FIELD

The present disclosure relates generally to the automatic detection and classification of objects by means of remote sensing.

BACKGROUND

Images are frequently created by sensors, and known techniques now exist for detecting and classifying objects contained in such images. Such images include photographs, line scan images, sonar images of the bottom of the sea, aerial and spacecraft images of planetary surfaces, photomicrographs, and the like. They may be two-dimensional, three-dimensional or of higher ordered dimensions. Images are typically stored digitally as image information.

Turning now to FIG. 1, a basic single-pass classifier 100 according to the prior art is illustrated in block diagram form. In accordance with classifier 100 a detector 102 receives image information captured by one or more sensors and examines it to identify potential "targets". Targets are objects having predefined characteristics or "features". For each potential target, a "new detection" is generated at block 104. Associated with each new detection is a spatial location 106 (which may be a latitude and longitude or any appropriate location reference) and a feature list 108. Features within the feature list are generally calculated numbers such as length, width, brightness at grayscale level, and the like.

A "single-pass classifier" 110 uses local image statistics to separate target pixels from background pixels. The feature extractor clusters pixels based on proximity and calculates geometric and intensity-based features for each pixel group. The classifier process compares the features of each group with the previously computed statistics of target and non-target groups to determine if the pixel group being examined is a better statistical match to a target or to a non-target.

The class, which may be a one of many or a one of two state result, along with the location and feature list, is placed into a "detection database" 112 which includes, for each location at which a detection was made, the location 114, the feature list 116 associated with the location, and the classification of the object 118 associated with the location.

The detection database, once reviewed by an expert operator for correctness, is then used by the "training system" 120 to generate "training parameters" 122 needed by the classifier 110.

While suitable for many applications, this general approach does not make provision for data received from multiple passes or views.

OVERVIEW

In one aspect of the invention a method is provided for classification of a potential target. The method includes the process steps of receiving image information, detecting a potential target within the image information and determining a plurality of features forming a feature set associated with the potential target, wherein the detecting is based upon at least some features and/or a location of the potential target, comparing the location of a potential target with contents of a detection database to determine if the location of the potential target is close to the location of an element in the detection database, using a single-pass classifier configured to (a) receive a potential target's feature set if the potential target is not close to the location of an element in the detection database, (b) classify the potential target, and (c) transmit the location, feature set and classification of the potential target to the detection database, using a fused multi-pass feature determiner configured to determine fused multi-pass features of the potential target if the potential target is close to the location of an element in the detection database; and using a multi-pass classifier configured to (a) receive the potential target's feature set and fused multi-pass features if the potential target is close to the location of an element in the detection database, (b) classify the potential target, and (c) transmit the location, feature set, fused multi-pass features and classification of the potential target to the detection database.

In another aspect of the invention, an apparatus is provided for classification of a potential target. The apparatus includes an input configured to receive image information, a detector configured to detect a potential target within the image information and determine a plurality of features forming a feature set associated with the potential target, wherein detection is based upon at least some features and/or a location of the potential target, a comparator configured to compare the location of a potential target with contents of a detection database to determine if the location of the potential target is close to the location of an element in the detection database, a single-pass classifier configured to (a) receive a potential target's feature set if the potential target is not close to the location of an element in the detection database, (b) classify the potential target, and (c) transmit the location, feature set and classification of the potential target to the detection database, a fused multi-pass feature determiner configured to determine fused multi-pass features of the potential target if the potential target is close to the location of an element in the detection database; and a multi-pass classifier configured to (a) receive the potential target's feature set and fused multi-pass features if the potential target is close to the location of an element in the detection database, (b) classify the potential target, and (c) transmit the location, feature set, fused multi-pass features and classification of the potential target to the detection database.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Figure 1:
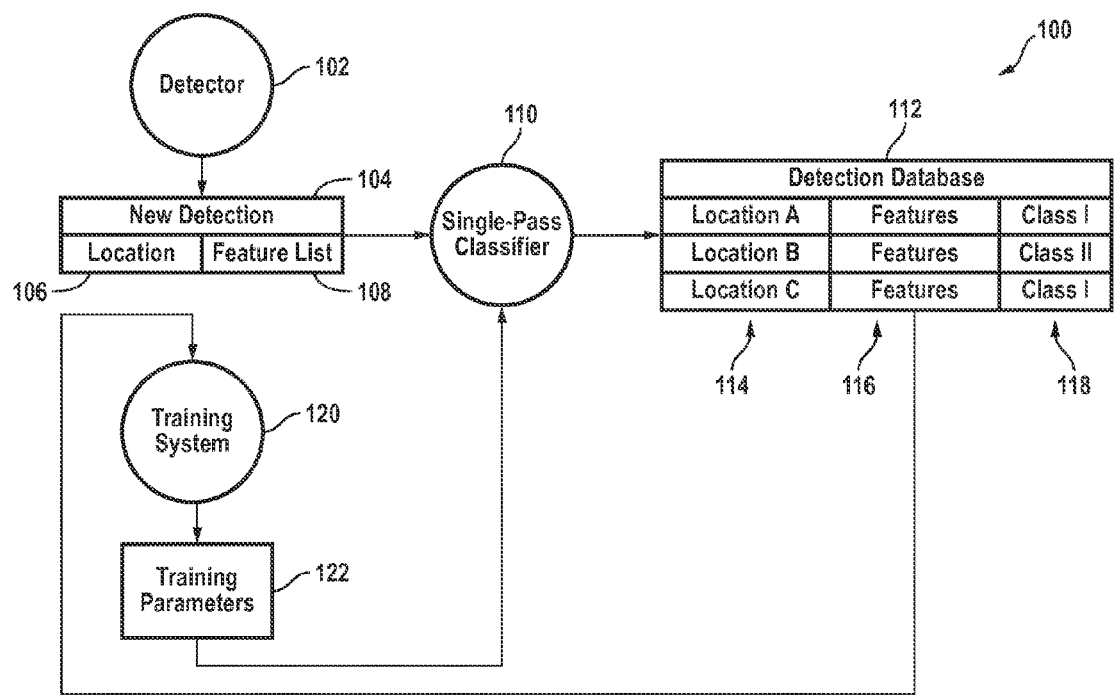
FIG. 1 is a system block diagram illustrating a single-pass classification system in accordance with the prior art.

Example embodiments are described herein in the context of a system which is configured to receive data from a sonar device. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In accordance with the present invention, the ability to utilize information from more than one pass by an object is provided. In essence, in one embodiment once a potential target has been isolated, the system will automatically look back at previous occasions when the same area has been scanned. If previous passes have occurred, the detection and thresholding process will be re-run on the old area and a match will be sought based on a template of position and of extracted features. A combination of the features from the current observation, together with those from one or more previous observations can then be used in a multi-pass classifier to improve the false alert performance of the system.

An advantage of this approach is that because an initial alert has been formed from a single pass, hindsight knowledge can be used to reduce the thresholds on the detector used for previous observations thus allowing additional features to be extracted. This approach is somewhat analogous to a human operator manually identifying an object in a data set and then manually looking back at previous observations, with the knowledge of where to look and what to look for, in order to extract additional information to improve future classification decisions. A further advantage is that by improving performance less fuel will be required to carry out a search for an object. The absence of a 'similar' target in prior data sets may also be used as a signal that there has been a change.

Figure 2:
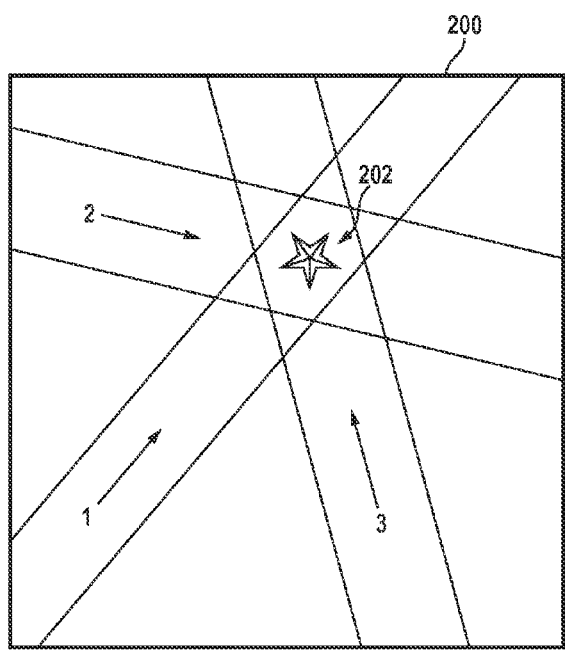
FIG. 2 is an illustration of a search pattern covering a potential target.

Turning now to FIG. 2, a scene 200 having an object 202 is illustrated. Three strip images "1", "2" and "3" represent images taken by a sensor on a moving platform as it passes by the object 202 along three different directions. The sensor may be a camera, a sonar device, a synthetic aperture radar imager, a magnetometer, or some other type of suitable sensor for remote sensing of an object. Each pass yields a somewhat different image of the object. A presently preferred way to carry out such a search is to conduct what is called a "lawn mower" (serpentine) search in one direction and then in a different direction (such as orthogonally to the first search direction) in order to try to capture as much distinct data as possible in a pair of searches. The object may be any sort of object that one might look at scanned data in order to find, e.g., manganese nodules, ship wrecks, rocks, or other valuable or dangerous objects on the sea floor, items of tactical or strategic interest in overhead images as from a satellite or a reconnaissance aircraft, suspect items in radiographic medical images, and the like.

Figure 3:
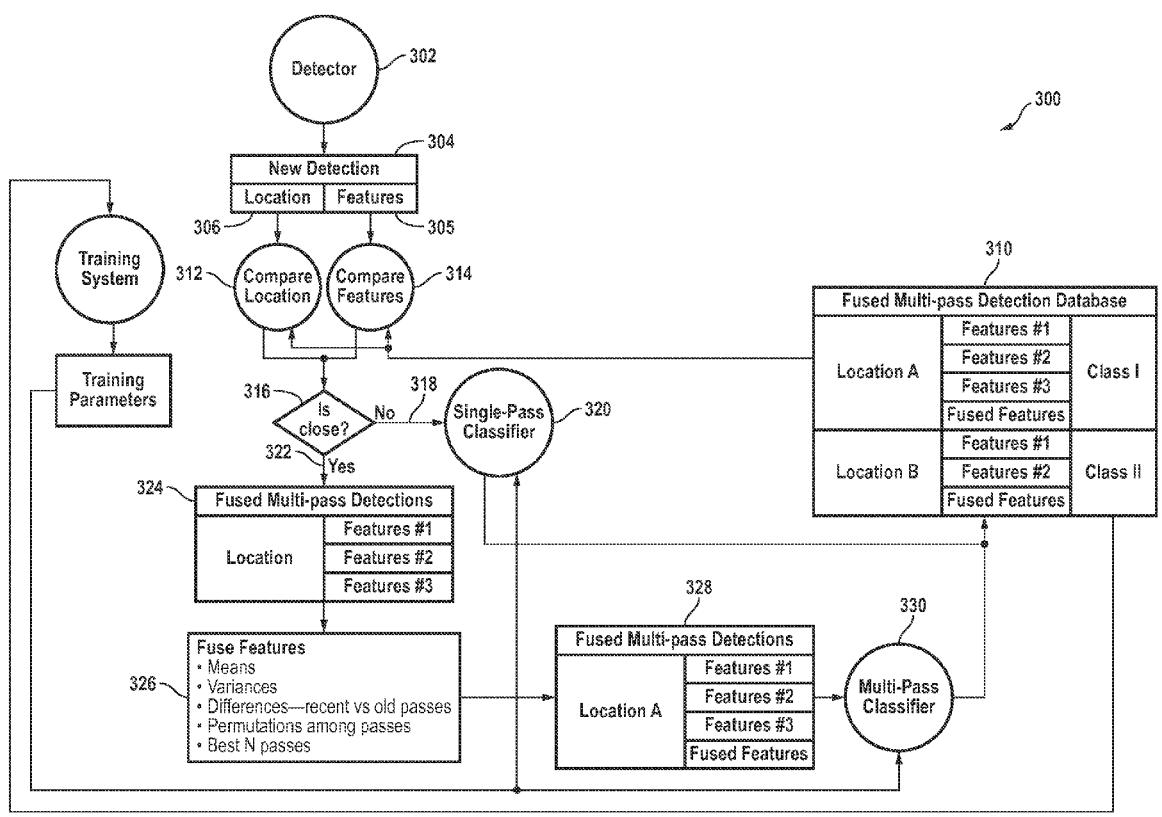
FIG. 3 is a system block diagram illustrating a multi-pass classification system in accordance with one embodiment.

Turning now to FIG. 3, a classifier 300 is illustrated in block diagram form. In accordance with classifier 300 a detector 302 receives image information captured by one or more sensors and examines it to identify potential "targets". Targets are objects having predefined characteristics or "features". For each potential target identified, a "new detection" is generated at block 304. Associated with each new detection is a spatial location 306 and a feature list 308. Features within the feature list 308 are generally numerical values calculated from inspection of the image information such as length, width, brightness at grayscale level, and the like. In accordance with one embodiment, features may include some or all of: major radius, minor radius, length to width (aspect) ratio, elliptical area, pixel area, total energy, mean energy over elliptical area, mean energy over pixel area, variance of energy over elliptical area, variance of energy over pixel area, peak intensity, histogrammatic information based upon gray scale intensities, and the like. Additionally, where shadow information is present, that information may also be used, e.g., direction of shadow, implied height of object, and the like.

When the location of the new detection is determined at 306, the object is extracted from its background using conventional image segmentation techniques, then features are extracted and then a fused multi-pass detection database 310 is checked 312 to see if other objects have been seen which are "close" to the location of the new detection and have similar features 314. In this manner, if something is close to, but not exactly at the same location, the misalignment may be due to navigation error, i.e., the recorded location for the old object and/or the new object are off a bit due to limitations in the navigation system, the object may have moved somewhat, or the old object and the new object may be different, thus the farther apart the old and new objects are, the more similarity may need to be required of the features in order to treat the old and new detections as of the same object. Thus, taking the location and features into account, at 316 a decision is made as to whether the new detection is close to an old object. If the new detection is not close to an existing object in the database (318), then there is only enough information to use a single-pass classifier 320. The class of the new detection is determined in the conventional manner and the object is added to the database 310.

If the newly detected object is close to an existing database entry (322), the features are added into a fused multi-pass detection (324)—a list of all the feature sets found at the location. Next, "fused features" are computed (326) by combining and comparing the feature sets of the various entries in the fused multi-pass detection corresponding to the location. Statistical features, such as means and variances can be computed, or the difference between the most recent feature sets and the older features. Permutations among the features may be used—e.g., using the length from feature set #1 with the brightness from features set #2. If there is a "quality" measure for each feature set, the best several feature sets may be used. Once computed, these fused feature are added to the multi-pass detection (328). Multi-pass classifier 330 then uses all of these features to compute the class of the detection, possibly different from the class previously stored in the database for the location.

The multi-pass classifier used with classifier 300 may be any classification engine that can examine the features associated with a location and determine a classification based thereon. Presently preferred is a Joint Gaussian Bayesian Classifier which imposes a Gaussian distribution upon the various features. Bayesian classifiers are designed to minimize classification error. Lacking a true probability density function for these measured real world features, they do not operate perfectly, however, with a large enough sample of training objects (objects for which the classification engine is told the "true" classification by a skilled operator), classifiers may be built that approach a theoretical "optimum" by minimizing the classification error on the training data set and assuming that the training data set has essentially the same probability distribution functions for the various features as the real world as measured by real sensors. Other types of appropriate classifiers may be used as well, such as neural network classifiers and the like.

Finally, the detection database 310 may be reviewed by an expert operator to insure that the classification values are correct, then it may be used by the training system to generate training parameters needed by the classifiers.

Training is accomplished in a conventional manner by showing the system examples of targets and having it optimize its response based upon the set of detections, their respective features and their respective classifications.

Figure 4:
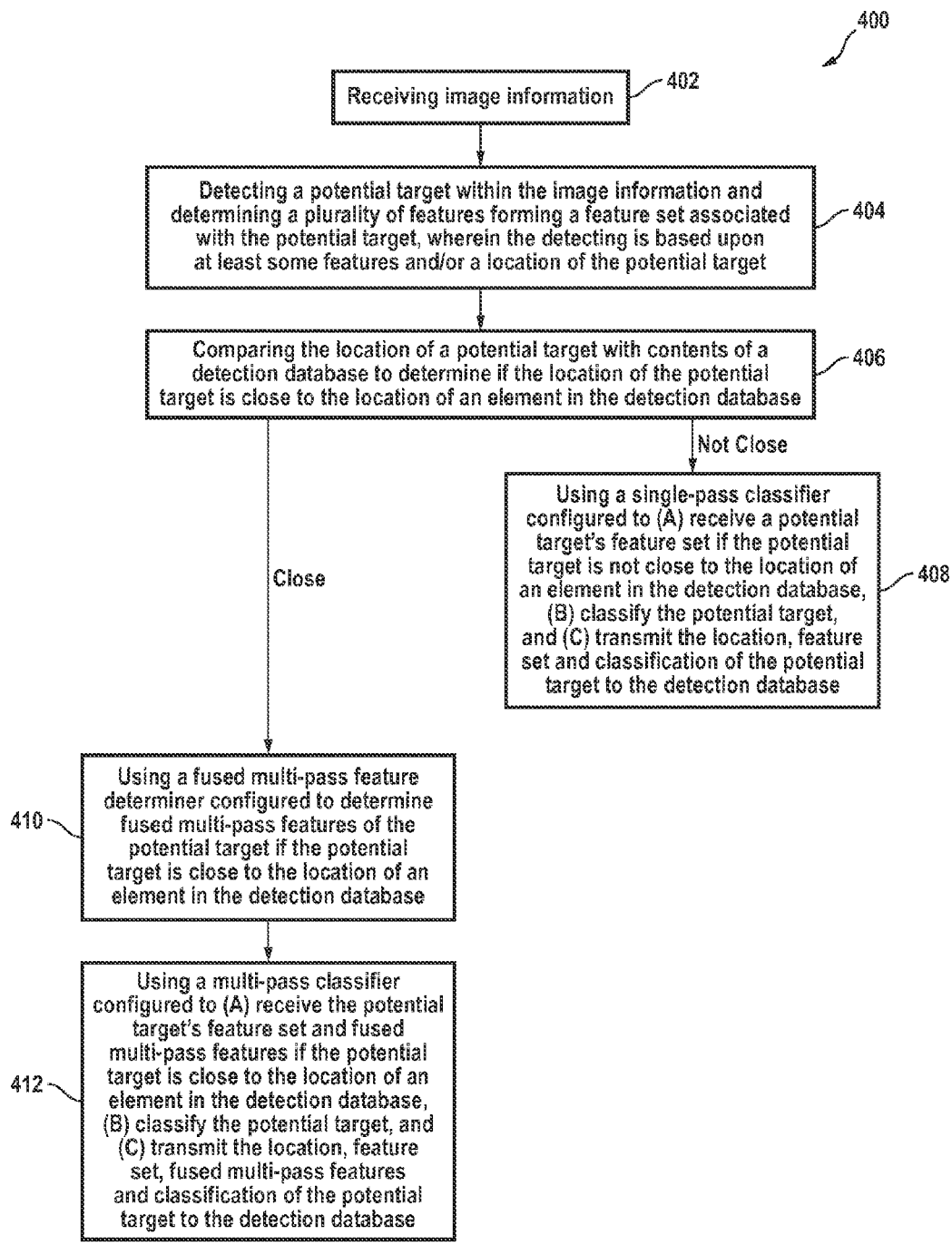
FIG. 4 is a process flow chart illustrating a multi-pass classification method in accordance with one embodiment.

Turning now to FIG. 4, a process flow diagram illustrates a process 400 for carrying out the operation of the system described above. At block 402 the systems receives image information representing an image captured by one or more sensors. At block 404 the system detects a potential target within the image information and determines a plurality of features forming a feature set associated with the potential target, wherein the detecting is based upon at least some features and/or a location of the potential target. At block 406 the system compares the location of a potential target with contents of a detection database to determine if the location of the potential target is close to the location of an element in the detection database. If the location of the potential target is close, control transfers to block 408, otherwise control transfers to block 410.

At block 408 the system uses a single-pass classifier configured to (a) receive a potential target's feature set if the potential target is not close to the location of an element in the detection database, (b) classify the potential target, and (c) transmit the location, feature set and classification of the potential target to the detection database.

At block 410 the system uses a fused multi-pass feature determiner configured to determine fused multi-pass features of the potential target if the potential target is close to the location of an element in the detection database. Subsequently at block 412 the system uses a multi-pass classifier configured to (a) receive the potential target's feature set and fused multi-pass features if the potential target is close to the location of an element in the detection database, (b) classify the potential target, and (c) transmit the location, feature set, fused multi-pass features and classification of the potential target to the detection database where it is stored for future reference.

In accordance with one example embodiment, the system may be applied to sonar images of the bottom of the sea floor and the system is configured to search for explosive mines. Since typical explosive mines are generally less than 2 meters×2 meters a somewhat larger image segmentation block of 5 meters×5 meters may be used. The location of a potential target is logged and the features extracted. A typical search pattern for mines would include moving back and forth in a "lawn mower" pattern along one direction (say North-South) to cover an area, then re-scanning the area in a similar pattern along another direction (say East-West). With some overlap, a large number of views of potential mines in the search area can quickly be built up in the detection database. The classifier having been previously trained to recognize such mines, it will be able now to recognize mines that might have been unrecognizable given the image produced by a single pass, but which when data from multiple passes is integrated together becomes very recognizable.

The system described above may be employed with more than one type of sensor, e.g., for a seabed search one could use acoustic, magnetic and even optical sensors in combination in order to improve false alert performance. If desired, one could also use a number of distinct classifiers, each using a different methodology, in order to improve performance.

Additional features may be incorporated into systems employing the techniques described herein. For example, the system may be set to automatically capture data when nearing a known target or potential target, even though it may not be in a "continuous capture" mode. In this way it may increase the validity of its training or automatically refine its classification of known or potential targets.

It is also possible to incorporate a plurality of different sensors to measure different features and include those additional features in the classification decisions.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. An apparatus comprising:
   an input port configured to receive first pass image information and second pass image information;
   a detector module configured to detect a potential target within the first pass image information and the second pass image information, and determine a plurality of features forming a feature set associated with the potential target and a new location of the potential target within the second pass image information, wherein detection is based upon one or more of at least some of the determined features and a location of the potential target within the first pass image information;
   a detection database configured to store at least a location, features, fused multi-pass features and a classification of the potential target;
   a comparator module configured to compare the new location of the potential target with contents of the detection database to determine whether the new location of the potential target is within a predetermined range of the location of an element in the detection database;
   a single-pass classifier module configured to (a) receive the potential target's feature set, if the new location of the potential target is not within said predetermined range of the location of an element in the detection database, (b) classify the potential target according to received potential target's feature set, and (c) transmit the location, the feature set and the classification of the potential target to the detection database;

a fused multi-pass feature determiner module configured to determine fused multi-pass features of the potential target by combining and comparing the features sets of the potential target corresponding to the new location of the potential target, if the new location of the potential target is within said predetermined range of the location of an element in the detection database; and a multi-pass classifier module configured to (a) receive the potential target's feature set and said determined fused multi-pass features, if the new location of the potential target is within said predetermined range of the location of an element in the detection database, (b) classify the potential target according to the received potential target's feature set and fused multi-pass features, and (c) transmit the location, the feature set, the fused multi-pass features and the classification of the potential target to the detection database.

2. A method, comprising:

receiving first pass image information;

detecting a potential target within the first pass image information and determining a plurality of features forming a feature set associated with the potential target, wherein the detecting is based upon one or more of at least some of the determined features and a location of the potential target;

storing said determined plurality of features in a detection database;

receiving second pass image information;

detecting a new location of the potential target within the second pass image information;

comparing the new location of the potential target with contents of the detection database to determine whether the new location of the potential target is within a predetermined range of the location of an element in the detection database;

using a single-pass classifier configured to (a) receive the potential target's feature set, if the potential target is not within said predetermined range of the location of an element in the detection database, (b) classify the potential target according to received potential target's feature set, and (c) transmit the location, the feature set and the classification of the potential target to the detection database;

combining and comparing the feature sets of the potential target corresponding to the new location of the potential target to determine fused multi-pass features of the potential target if the new location of the potential target is within said predetermined range of the location of an element in the detection database; and using a multi-pass classifier configured to (a) receive the potential target's feature set and said determined fused multi-pass features, if the new location of the potential target is within said predetermined range of the location of an element in the detection database, (b) classify the potential target according to the received potential target's feature set and fused multi-pass features, and (c) transmit the location, the feature set, the fused multi-pass features and the classification of the potential target to the detection database.

3. An apparatus, comprising:

means for receiving first pass image information second pass image information;

means for detecting a potential target within the first pass image information and second pass image information, and determining a plurality of features forming a feature set associated with the potential target and a new location of the potential target within the second pass image information, wherein the detecting is based upon one or more at least some of the determined features and a location of the potential target;

detection storage means configured to store at least a location, features, fused multi-pass features and a classification of the potential target;

means for comparing the new location of potential target with contents of the detection database means to determine whether the location of the potential target is within a predetermined range of the location of an element in the detection storage means;

mean for (a) receiving the potential target's feature set, if the new location of the potential target is not close to the location of an element in the detection database means, (b) classifying the potential target according to received potential target's feature set, and (c) transmitting the location, the feature set and the classification of the potential target to the detection storage means;

means for determining fused multi-pass features of the potential target, if the potential target is within a predetermined range of the location of an element in the detection storage means; and means for (a) receiving the potential target's feature set and said determined fused multi-pass features, if the new location of the potential target is within said predetermined range of the location of an element in the detection database (b) classifying the potential target according to the received potential target's feature set and fused multi-pass features, and (c) transmitting the location, the feature set, the fused multi-pass features and the classification of the potential target to the detection storage means.

4. The apparatus of claim 1, wherein the detector module is configured to determine said plurality of features using image segmentation.

5. The apparatus of claim 1, wherein the potential target classification is stored in the detection database.

6. The apparatus of claim 1, further comprising a training system to generate training parameters needed by the single pass and multi-pass classifiers, using the detection database.

7. The apparatus of claim 1, wherein the first pass and second pass image information are received from one or more sensors on a moving platform.

8. The apparatus of claim 1, wherein the potential target is one or more of the group consisting of manganese nodules, ship wrecks, rocks on the sea floor, images from a satellite or a reconnaissance aircraft, and suspect items in radiographic medical images.

9. The method of claim 2, wherein said determining the plurality of features comprises using image segmentation.

10. The method of claim 2, further comprising storing the potential target classification in the detection database.

11. The method of claim 2, further comprising generating training parameters needed by the single pass and multi-pass classifiers by a training system, using the detection database.

12. The method of claim 2, wherein the first pass and second pass image information are received from one or more sensors on a moving platform.

13. The method of claim 2, wherein the potential target is one or more of the group consisting of manganese nodules, ship wrecks, rocks on the sea floor, images from a satellite or a reconnaissance aircraft, and suspect items in radiographic medical images.

14. A method for detection and classification of objects, the method comprising:

detecting a potential target within a first pass image information obtained via scanning an area of interest, by determining a plurality of first features and a first location of the potential target;

determining whether said area of interest has been scanned prior to obtaining the first pass image information when said area of interest has been scanned prior to obtaining the first pass image information, comparing the first location of the potential target with an old location of the potential target detected prior to obtaining the first pass image information to determine whether the new location is within a predetermined range of said location;

extracting a plurality of first features for the potential target at the first location, when the first location is within a predetermined range of old location;

combining the first features with old features extracted from the potential target detected prior to obtaining the first pass image information to classify the potential target; and when the first location is not within a predetermined range of said old location, using said old features to classify the potential target.

15. The method of claim 14, wherein said determining the first plurality of features comprises using image segmentation.

16. The method of claim 14, further comprising storing the potential target classification in the detection database.

17. The method of claim 14, further comprising generating training parameters needed by the single pass and multi-pass classifiers by a training system, using the detection database.

18. The method of claim 14, wherein the first pass and prior pass image information are received from one or more sensors on a moving platform.

19. The method of claim 14, wherein the potential target is one or more of the group consisting of manganese nodules, ship wrecks, rocks on the sea floor, images from a satellite or a reconnaissance aircraft, and suspect items in radiographic medical images.

* * * * *